United States Patent
Lee

(10) Patent No.: US 11,778,504 B2
(45) Date of Patent: Oct. 3, 2023

(54) TERMINAL DEVICE, DATA TRANSMISSION/RECEPTION DEVICE, AND OPERATING METHOD OF DEVICE

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 119 days.

(21) Appl. No.: 16/758,143

(22) PCT Filed: Oct. 18, 2018

(86) PCT No.: PCT/KR2018/012330
§ 371 (c)(1),
(2) Date: Apr. 22, 2020

(87) PCT Pub. No.: WO2019/083223
PCT Pub. Date: May 2, 2019

(65) Prior Publication Data
US 2020/0288343 A1    Sep. 10, 2020

(30) Foreign Application Priority Data

Oct. 25, 2017 (KR) .......................... 10-2017-0139312
Oct. 18, 2018 (KR) .......................... 10-2018-0124714

(51) Int. Cl.
*H04W 28/02* (2009.01)
*H04L 45/00* (2022.01)
(Continued)

(52) U.S. Cl.
CPC ......... *H04W 28/0268* (2013.01); *H04L 41/12* (2013.01); *H04L 45/02* (2013.01); *H04L 45/38* (2013.01); *H04W 28/0263* (2013.01)

(58) Field of Classification Search
CPC .......... H04W 28/0268; H04W 28/0263; H04L 41/12; H04L 45/02; H04L 45/38; H04L 45/26; H04L 49/3009
See application file for complete search history.

(56) References Cited

U.S. PATENT DOCUMENTS

2012/0263041 A1* 10/2012 Giaretta .............. H04L 63/0428
370/236
2015/0319662 A1    11/2015 Enomoto et al.
(Continued)

FOREIGN PATENT DOCUMENTS

WO    WO 2016/164714    10/2016
WO    WO 2017/009525    1/2017

OTHER PUBLICATIONS

International Search Report dated Jan. 4, 2019 issued in Application No. PCT/KR2018/012330.
3GPP TR 23.799 V14.0.0, $3^{rd}$ Generation Partnership Project; Technical Specification Group Services and System Aspects; Study on Architecture for Next Generation System (Release 14), Dec. 16, 2016.
(Continued)

*Primary Examiner* — Donald L Mills
(74) *Attorney, Agent, or Firm* — KED & ASSOCIATES, LLP

(57) ABSTRACT

Disclosed is a technology for resolving the problems of the conventional 5G ULCL function and efficiently supporting requirements/performance of the URLLC service supported by 5G as the terminal implements a new technology, that is, ULCL of the terminal capable of controlling steering of the transmission path of its own traffic.

14 Claims, 9 Drawing Sheets

(51) Int. Cl.
*H04L 45/02* (2022.01)
*H04L 41/12* (2022.01)

(56) References Cited

U.S. PATENT DOCUMENTS

| | | |
|---|---|---|
| 2016/0353324 A1 | 12/2016 | Lee et al. |
| 2018/0092147 A1 | 3/2018 | Pelletier et al. |
| 2018/0199228 A1 | 7/2018 | Van Phan et al. |
| 2018/0331958 A1* | 11/2018 | Lee ................. H04W 28/24 |
| 2019/0394169 A1* | 12/2019 | Yin ................. H04L 63/0254 |
| 2020/0037197 A1* | 1/2020 | Cho ................. H04W 28/0263 |
| 2020/0128430 A1* | 4/2020 | Yi ................... H04L 47/2491 |
| 2021/0204162 A1* | 7/2021 | Chunduri ............ H04L 41/40 |
| 2021/0289390 A1* | 9/2021 | Zhou ................. H04L 47/20 |

OTHER PUBLICATIONS http://winner.ajou.ac.kr/publication/data/domestic/framework_kjs_2011.pdf.
Korean Office Action dated Jul. 23, 2019 issued in Application No. 10-2018-0124714 (English Translation attached).
Korean Office Action dated Jan. 22, 2020 issued in Application No. 10-2018-0124714 (English Translation attached).
Source Packet Routing in Networking (SPRING) Problem Statement and Requirements. RFC 7855. IETF. 2016 5. https://toolsietf.org./pdf/rfc7855pdf.end.
Korean Office Action dated Jul. 29, 2020 issued in Application No. 10-2018-0124714 (English translation attached).

* cited by examiner

FIG. 6

| ULCL Code | Slice ID | Destination Server ID | Destination Server Port | Source Client IP | Source Client Port | Bandwidth Requirement | Latency Requirement |
|---|---|---|---|---|---|---|---|
| 1 | URLLC | 172.16.10.11 | 443 | 172.16.1.2 | 4000 | 1Gb/s | 0.1ms |
| 2 | URLLC | 172.16.10.12 | 443 | 172.16.1.2 | 4000 | 400Mb/s | 0.2ms |
| 3 | eMBB | 172.16.51.10 | 83 | 172.16.1.2 | 4040 | 5Gb/s | 0.5ms |
| 4 | mMTC | | | | | | |
| 5 | ... | | | | | | |

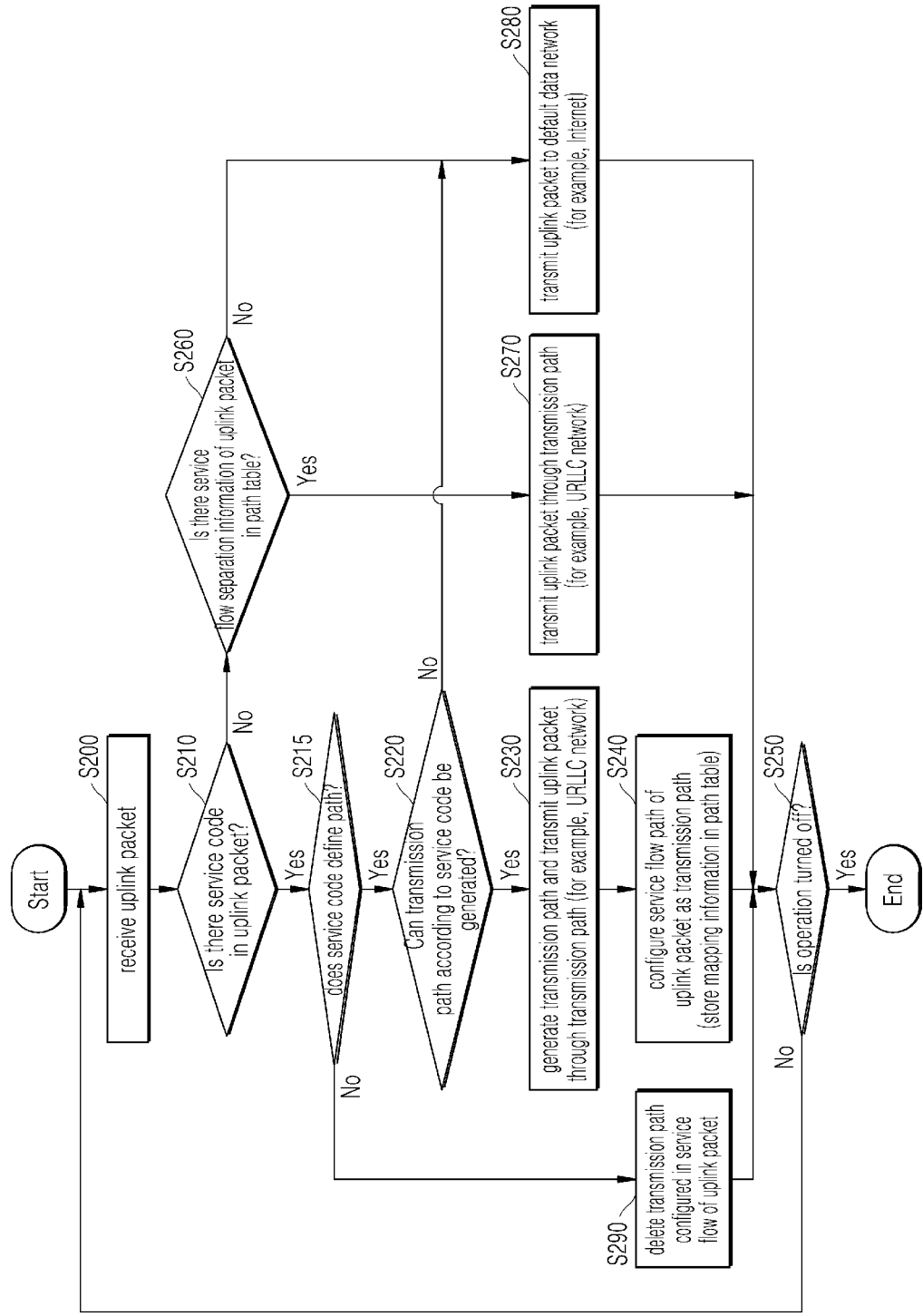

TERMINAL DEVICE, DATA TRANSMISSION/RECEPTION DEVICE, AND OPERATING METHOD OF DEVICE

BACKGROUND OF THE INVENTION

1. Field of the Invention

The present disclosure relates to a technology by which a terminal can control its own data transmission path.

This application is a U.S. National Stage Application under 35 U.S.C. § 371 of PCT Application No. PCT/KR2018/012330, filed Oct. 18, 2018, which claims priority to Korean Patent Application Nos. 10-2017-0139312, filed Oct. 25, 2017, and 10-2018-0124714, filed Oct. 18, 2018 the entire content of which is hereby incorporated by reference.

2. Description of the Prior Art

As communication service types and required transmission rates are diversified in an LTE communication system, it has been actively conducted to establish more LTE frequencies and evolve to a 5G communication system.

The 5G communication system is rapidly evolving, so that it accommodates as many terminals as possible on the basis of limited radio resources, and supports various service types such as enhanced Mobile Broadband (eMBB)/massive Machine-Type Communications (mMTC)/Ultra-Reliable and Low-Latency Communications (URLLC).

Particularly, 5G defines a network structure for supporting a terminal, a Base Station (BS) (access), a core, and a server in an end-to-end form.

Specifically, 5G defines a network structure where an area (control plane) having a control-signaling function is separated from an area (user plane) having a data transmission/reception function unlike conventional LTE (4G).

At this time, control nodes of the control plane according to 5G may be defined as an Access and Mobility Function (AMF) for controlling radio section access of the terminal, a Policy Control Function (PCF) for managing/controlling a policy of subscriber information, subscription service information for each subscriber, and payment, and a Session Management Function (SMF) for managing/controlling a session for using a data service for each terminal.

Further, a data node of the user plane according to 5G may be defined as a User Plane Function (UPF) which transmits and receives data between the terminal and the server over a data network (for example, the Internet) through a session with the terminal on the basis of the control of (link with) the SMF.

Meanwhile, in 5G, the UPF of the user plane defines a function (hereinafter, referred to as an Uplink Classifier (ULCL)) of steering traffic of the terminal to a local network located near the terminal.

The ULCL function is briefly described below.

For each UPF of the user plane, the SMF basically transmits information such as a terminal identifier/destination IP address/prefix for traffic that each UPF should steer to the local network.

Accordingly, the UPF steers a corresponding uplink packet (traffic) among the received uplink packets to the local network on the basis of information received from the SMF.

That is, according to the ULCL function of current 5G, the UPF completely depends on the information received from the SMF.

Therefore, the SMF has a problem of overhead generated by continuous management of a large amount of information such as a terminal identifier/destination IP address/prefix to be transmitted to each UPF. In addition, the UPF has a problem of overhead generated by continuous management of information such as the received terminal identifier/destination IP address/prefix. Of course, there is a problem of a signaling increase between the SMF and the UPF.

Meanwhile, from the viewpoint of the terminal, that is, the user, the user is aware of steering of the transmission path for its own traffic and wishes to independently control the transmission path, but the ULCL function of current 5G cannot satisfy the demand at all.

Accordingly, the present disclosure proposes a new method by which the terminal can independently control steering of the transmission path of its own traffic, thereby effectively resolving the above-described problems of the ULCL function of current 5G.

SUMMARY OF THE INVENTION

An aspect of the present disclosure is to implement a method by which a terminal can independently control its own data transmission path.

In accordance with an aspect of the present disclosure, an apparatus for transmitting and receiving data is provided. The apparatus includes: an identification unit configured to identify whether specific information for defining a transmission path exists within a received uplink packet; a path configuration unit configured to generate a transmission path according to the specific information when the specific information exists and configure the generated transmission path as a service flow path of the uplink packet; and a transmission unit configured to transmit an uplink packet separated for the service flow among received uplink packets through the transmission packet.

Specifically, the apparatus may include a local link unit configured to support the generation of at least one transmission path having a destination corresponding to a device within each local network by linking with at least one local network, wherein the path configuration unit is configured to generate the transmission path according to the specific information within a range supported by the local link unit.

Specifically, the at least one local network may include at least one of an internal network in which another data transmission/reception apparatus is located and a local data network in which a local server is located.

Specifically, the path configuration unit may be configured to store mapping information for mapping service flow separation information of the uplink packet and the generated transmission path in a path table and configure the generated transmission path according to the specific information as the service flow path of the uplink packet.

Specifically, the transmission unit may be configured to transmit an uplink packet that has specific information but for which the path configuration unit fails in generating a transmission path according to specific information, among the received uplink packets, to a default data network.

Specifically, the transmission unit may be configured to transmit an uplink packet for which no service flow separation information exists in the path table, among the received uplink packets, to a default data network.

Specifically, when reception of an uplink packet with request information that makes a request for deleting the transmission path is identified, the path configuration unit may be configured to delete the transmission path configured as the service flow path of the uplink packet.

In accordance with another aspect of the present disclosure, an apparatus of a terminal is provided. The apparatus includes: a separate unit configured to separate service flows of uplink packets to be transmitted; an information insertion unit configured to, when a predefined triggering condition is satisfied, insert specific information for defining a transmission path of a service flow into an uplink packet of the service flow according to the satisfied triggering condition among the separated service flows; and a transmission unit configured to transmit the uplink packet to a data node.

Specifically, the information insertion unit may be configured to insert the specific information into a first uplink packet of the service flow.

Specifically, policy information for selecting specific information on the basis of the triggering condition may be pre-stored in an information table including a plurality of pieces of specific information, and the information insertion unit may be configured to select and insert the specific information on the basis of the information table and the policy information.

Specifically, the triggering condition may be satisfied when a specific service flow that requires configuration of a transmission path based on specific information is generated, when a slice ID of a specific service type that requires configuration of a transmission path based on specific information is used, when the quality of a radio signal becomes equal to or smaller than a specific value that requires configuration of a transmission path based on specific information, when the apparatus of the terminal is located in a specific area that requires configuration of a transmission path based on specific information, when an amount of used traffic is larger than a specific value that requires configuration of a transmission path, or when a control event is received from a core network.

Specifically, the specific information may include a service code for defining at least one of a service type supported by the transmission path, address information of a device corresponding to a destination of the transmission path, service capacity information of the transmission path, and delay information.

Specifically, the information insertion unit may be configured to insert request information that makes a request for deleting the transmission path into the last uplink packet of a transmitted service flow into which the specific information is inserted.

In accordance with an aspect of the present disclosure, a method of operating a data transmission and reception apparatus is provided. The method includes: an identification step of identifying whether specific information for defining a transmission path exists within a received uplink packet; a path configuration step of generating a transmission path according to the specific information when the specific information exists and configuring the generated transmission path as a service flow path of the uplink packet; and a transmission step of transmitting an uplink packet separated for the service flow among received uplink packets through the transmission packet.

Specifically, the path configuration step may include storing mapping information for mapping service flow separation information of the uplink packet and the generated transmission path in a path table and configuring the generated transmission path according to the specific information as the service flow path of the uplink packet.

Specifically, the transmission step may include transmitting an uplink packet which has specific information but for which the path configuration unit fails in generating a transmission path according to specific information to a default data network or an uplink packet for which no service flow separation information exists in the path table to a default data network.

In accordance with an aspect of the present disclosure, a method of operating a terminal apparatus is provided. The method includes: a separation step of separating service flow of uplink packet to be transmitted; an information insertion step of, when a predefined triggering condition is satisfied, inserting specific information for defining a transmission path of a service flow into an uplink packet of the service flow according to the satisfied triggering condition, among the separated service flows; and a transmission step of transmitting the uplink packet to a data node.

Specifically, the information insertion step may include inserting the specific information into a first uplink packet of the service flow for each service flow.

Specifically, the method may further include pre-storing policy information for selecting specific information on the basis of the triggering condition in an information table including a plurality of pieces of specific information, and the information insertion step may include selecting and inserting the specific information on the basis of the information table and the policy information.

Specifically, the specific information may include a service code for defining at least one of a service type supported by the transmission path, address information of a device, corresponding to the destination of the transmission path, service capacity information of the transmission path, and delay information.

In accordance with another aspect of the present disclosure, a computer program combined with hardware and stored in a medium to perform the steps is provided. The steps include: separating service flow of uplink packet to be transmitted; when a predefined triggering condition is satisfied, inserting specific information for defining a transmission path of a service flow into an uplink packet of the service flow according to the satisfied triggering condition among the separated service flows; and transmitting the uplink packet to a data node.

According to various embodiments of the present disclosure, it is possible to realize a new method (technology) by which a terminal can independently control steering of a transmission path for traffic.

According to various embodiments of the present disclosure, an overhead problem and an increased signaling problem between an SMF and a UPF caused by a conventional 5G ULCL function can be resolved and requirements/performance of a service type served by 5G can be efficiently supported.

BRIEF DESCRIPTION OF THE DRAWINGS

FIG. 6 illustrates the configuration of a definition table possessed by a data transmission/reception apparatus according to an embodiment of the present disclosure;

FIG. 9 is a flowchart illustrating a method of operating a data transmission/reception apparatus according to an embodiment of the present disclosure.

DETAILED DESCRIPTION OF THE EXEMPLARY EMBODIMENTS

Hereinafter, embodiments of the present disclosure are described with reference to the accompanying drawings.

The present disclosure relates to a technology for controlling a transmission path of data of a terminal.

Particularly, the present disclosure takes into consideration a 5G communication system which will be introduced in the future.

The 5G communication system accepts as large a number of terminals as possible on the basis of limited radio resources and supports various service types, such as enhanced Mobile Broadband (eMBB)/massive Machine Type Communications (mMTC)/Ultra-Reliable and Low Latency Communications (URLLC), while accommodating as many terminals as possible on the basis of limited radio resources.

Particularly, in 5G, a terminal, a network structure for supporting a Base Station (BS) (access), a core, and a server in an end-to-end form are defined.

Specifically, in 5G, a network structure for separating an area (control plane) having a control-signaling function and an area (user plane) having a data transmission/reception function is defined, unlike conventional LTE (4G).

At this time, in 5G, control nodes of the control plane may be defined as an Access and Mobility Function (AMF), which controls radio section access of the terminal, a Policy Control Function (PCF), which manages/controls a policy of subscriber information, subscription service information for each subscriber, and payment, and a Session Management Function (SMF), which manages/controls a session for using a data service for each terminal.

Further, in 5G, a data node of the user plane may be defined as a User Plane Function (UPF) which transmits and receives data between the terminal and the server over a data network (for example, the Internet) through a session with the terminal on the basis of the control of (link with) the SMF.

Meanwhile, in 5G, the UPF of the user plane defines a function (hereinafter, referred to as an Uplink Classifier (ULCL)) for steering traffic of the terminal to a local network located near the terminal.

Figure 1:
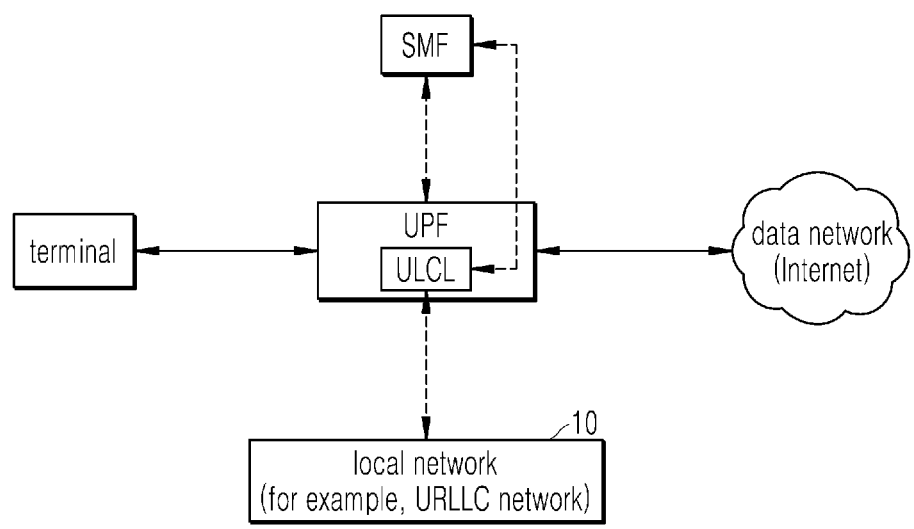
FIG. 1 illustrates an Uplink Classifier (ULCL) system of conventional 5G related to the present disclosure.

A ULCL function in current 5G is briefly described below with reference to FIG. 1.

The ULCL function is a technology implemented by the UPF of the user plane and steers traffic of the terminal to a nearby local network 10 (for example, a URLLC network).

According to the ULCL function of current 5G, for each UPF, the SMF of the control plane basically transmits and inform of information such as a terminal identifier/destination IP address/prefix of traffic which the UPF should steer to a local network through a transmission path.

Accordingly, each UPF may steer a corresponding uplink packet (traffic), among received uplink packets, to the local network 10 (URLLC network) on the basis of the information (terminal identifier/destination IP address/prefix) received from the SMF.

That is, according to the ULCL function of current 5G, the UPF completely depends on the information received from the SMF.

Therefore, from the viewpoint of the SMF, the ULCL function of current 5G has a problem of overhead since a large amount of information, such as the terminal identifier/destination IP address/prefix to be transmitted to each UPF should be continuously managed.

Further, from the viewpoint of the UPF, the ULCL function of current 5G has a problem of overhead since the received information of the terminal identifier/destination IP address/prefix should be continuously managed.

Of course, the ULCL function of current 5G has a problem of increased signaling between the SMF and the UPF.

Meanwhile, from the viewpoint of the terminal, that is, the user, the user is aware of steering of the transmission path of its own traffic and wishes to independently control the transmission path, but the ULCL function of current 5G cannot satisfy the demand at all.

Accordingly, the present disclosure proposes a new method by which the terminal can independently control steering of the transmission path of its own traffic, thereby effectively resolving the above-described problems with the ULCL function of current 5G.

Specifically, the present disclosure proposes a terminal apparatus and a data transmission/reception apparatus for implementing the proposed new method (hereinafter, ULCL of the terminal).

Hereinafter, the new method proposed by the present disclosure, that is, the ULCL function of the terminal is briefly described with reference to FIG. 2.

The terminal apparatus 100 has a function (for example, ULCL agent) for implementing ULCL of the terminal proposed by the present disclosure.

A data transmission/reception apparatus 200 of the present disclosure is each UPF of the user plane.

Accordingly, the data transmission/reception apparatus 200, that is, the UPF 200 in the present disclosure has a function (for example, ULCL server) for implementing ULCL of the terminal proposed by the present disclosure.

The ULCL agent of the terminal apparatus 100 and the ULCL server of the data transmission/reception apparatus 200 may perform a function distributed/installed in the form of an application (or program) or hardware (for example, chip) installed to the terminal apparatus 100 or the data transmission/reception apparatus 200 having the function.

The terminal apparatus 100 according to the present disclosure separates service flows of uplink packets to be transmitted on the basis of operation of the ULCL agent.

The terminal apparatus 100 inserts specific information for defining a transmission path of the service flow into an uplink packet of the service flow to which the ULCL function of the terminal is applied on the basis of the operation of the ULCL agent.

Thereafter, the terminal apparatus 100 transmits the uplink packet to a data node, that is, its own data transmission/reception apparatus 200 (UPF).

In the present disclosure, the data transmission/reception apparatus 200 (UPF) identifies whether there is specific information for defining the transmission path in the uplink packet when receiving the uplink packet from the terminal apparatus 100 on the basis of the operation of the ULCL server.

When there is specific information in the uplink packet from the terminal apparatus 100 on the basis of the operation of the ULCL server, the data transmission/reception apparatus 200 (UPF) generates a transmission path to a local network, that is, a second DN 10 (for example, the URLLC network) or a third DN 20 (for example, internal network_UPF) and configures the generated transmission path as a service flow path of this uplink packet according to the specific information.

Accordingly, the data transmission/reception apparatus 200 (UPF) may transmit the uplink packet identified as the service flow generating the transmission path according to the specific information among the received uplink packets to the local network 10 or 20 along the configured service flow path (transmission path) on the basis of the operation of the ULCL server.

Of course, the data transmission/reception apparatus 200 (UPF) may transmit a downlink packet received from the local network 10 or 20 to the terminal apparatus 100 along the service flow path (transmission path) on the basis of the operation of the ULCL server.

Figure 2:
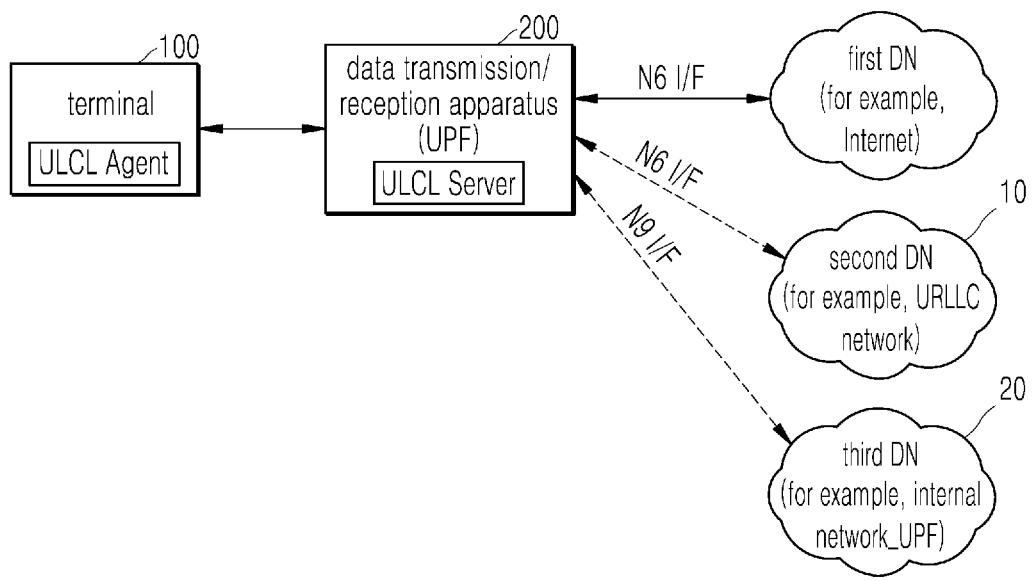
FIG. 2 illustrates a ULCL function of a terminal proposed by the present disclosure.

As illustrated in FIG. 2, according to the ULCL function of the terminal proposed by the present disclosure, when the terminal apparatus 100 determines (selects) specific information defining the transmission path on the basis of the specific information configured between the terminal apparatus 100 and the data transmission/reception apparatus 200 (UPF), the data transmission/reception apparatus 200 (UPF) may generate the transmission path according to the specific information and steer traffic (uplink/downlink packet) to the local network 10.

Therefore, according to the ULCL function of the terminal proposed by the present disclosure, the terminal may independently steer the transmission path of its own traffic on the basis of specific information, and the UPF may not depend on information (terminal identifier/destination IP address/prefix) provided from the SMF.

Hereinafter, the configuration of a terminal apparatus and a data transmission/reception apparatus according to an embodiment of the present disclosure will be described in more detail.

For convenience of description, the reference numerals illustrated in FIG. 2 are used.

The configuration of the terminal apparatus according to an embodiment of the present disclosure is described with reference to FIG. 3.

Figure 3:
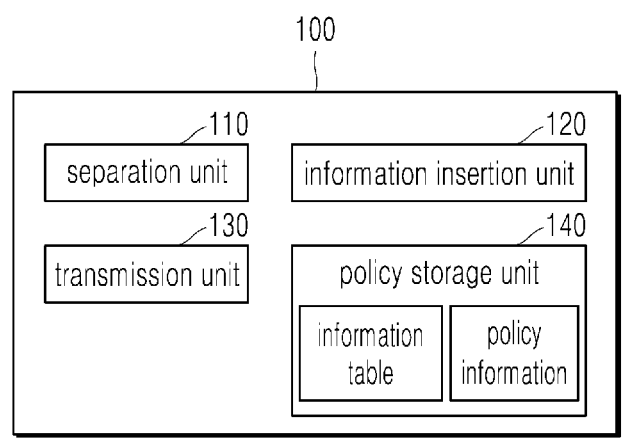
FIG. 3 is a block diagram illustrating the configuration of a terminal apparatus according to an embodiment of the present disclosure.

As illustrated in FIG. 3, the terminal apparatus 100 according to an embodiment of the present disclosure includes a separation unit 110, an information insertion unit 120, and a transmission unit 130.

The terminal apparatus 100 according to an embodiment of the present disclosure may further include a policy storage unit 140.

Some or all of the separation unit 110, the information insertion unit 120, the transmission unit 130, and the policy storage unit 140 may be implemented as a ULCL agent for performing ULCL of the terminal proposed by the present disclosure.

The separation unit 110 separates services flows of an uplink packet to be transmitted.

Specifically, when an uplink packet to be transmitted by the terminal apparatus 100 is generated, the separation unit 110 may separate service flows on the basis of information included in a packet header, for example, 5-tuple (Source IP, Destination IP, Source Port, Destination Port, and Protocol ID) in every uplink packet.

Of course, the separation unit 110 in the present disclosure may separate service flows on the basis of application information, for example, a content header (HTTP/2, FTP, QUIC Protocol) and video/audio information, for example, a streaming header (HTTP Live Streaming, MPEG-DASH, WebRTC, RSTP) as well as 5-tuple (packet flow information).

However, hereinafter, an example of separating service flows on the basis of 5-tuple (packet flow information) is described as an embodiment.

When a predefined triggering condition is satisfied, the information insertion unit 120 inserts specific information for defining a transmission path of a service flow into an uplink packet of the service flow according to the triggering condition among service flows separated by the separation unit 110.

That is, when the predefined triggering condition is satisfied, the information insertion unit 120 may insert specific information for defining a transmission path of a service flow into an uplink packet of the service flow according to the triggering condition satisfied this time by activating the ULCL function of the terminal.

The triggering condition may be defined to be satisfied when a specific service flow that requires configuration of a transmission path on the basis of specific information is generated, when a slice ID of a specific service type that requires configuration of a transmission path on the basis of specific information is used, when the quality of a radio signal becomes equal to or smaller than a specific value that requires configuration of a transmission path on the basis of specific information, when the terminal apparatus is located in a specific area that requires configuration of a transmission path on the basis of specific information, when an amount of used traffic is larger than a specific value that requires configuration of a transmission path, or when a control event is received from a core network.

For example, when a specific service flow that requires configuration of the transmission path is generated in the terminal apparatus 100, the information insertion unit 120 may determine that the triggering condition is satisfied.

In this case, the information insertion unit 120 may insert the specific information for defining the transmission path of the service flow into the uplink packet of the specific service flow on the basis of the triggering condition satisfied this time and policy information described below.

In another example, when a slice ID of a specific service type (for example, eMBB, mMTC, or URLLC) that requires configuration of the transmission path is used by the terminal apparatus 100, the information insertion unit 120 may determine that the triggering condition is satisfied.

In this case, the information insertion unit 120 may insert the specific information for defining the transmission path of the service flow into the uplink packet of the service flow according to the slice ID of the specific service type (for example, eMBB, mMTC, or URLLC) on the basis of the triggering condition satisfied this time and policy information described below.

In another example, when the quality of the radio signal measured by the terminal apparatus 100 becomes equal to or smaller than a specific value that requires configuration of the transmission path, the information insertion unit 120 may determine that the triggering condition is satisfied.

In this case, the information insertion unit 120 may insert the specific information for defining the transmission path of the service flow into the uplink packet of each service flow or some of the service flows (for example, slice ID of the specific service type (for example, eMBB, mMTC, or URLLC)) used by the terminal apparatus 100 on the basis of the triggering condition satisfied this time and policy information described below.

In another example, when the terminal apparatus 100 is located in a specific area that requires configuration of the transmission path, the information insertion unit 120 may determine that the triggering condition is satisfied.

In this case, the information insertion unit 120 may insert the specific information for defining the transmission path of the service flow into the uplink packet of each service flow or some of the service flows (for example, the slice ID of the specific service type (for example, eMBB, mMTC, or URLLC)) used by the terminal apparatus 100 on the basis of the triggering condition satisfied this time and policy information described below.

In another example, when the amount of used traffic of the terminal apparatus 100 is larger than a specific value that requires configuration of the transmission path or a control event is received from the core network, the information insertion unit 120 may determine that the triggering condition is satisfied.

In this case, the information insertion unit 120 may insert the specific information for defining the transmission path of the service flow into the uplink packet of each service flow or some of the service flows (for example, slice ID of the specific service type (for example, eMBB, mMTC, or URLLC)) used by the terminal apparatus 100 on the basis of the triggering condition satisfied this time and policy information described below.

In another example, when a control event is received from a core network, for example, a 5G N/W (for example, AMF, 3rd-party MEC server, or Mgmt server), the information insertion unit 120 may determine that the triggering condition is satisfied.

In this case, the information insertion unit 120 may insert the specific information for defining the transmission path of the service flow into the uplink packet of each service flow or some of the service flows (for example, slice ID of the specific service type (for example, eMBB, mMTC, or URLLC)) used by the terminal apparatus 100 on the basis of the triggering condition satisfied this time and policy information described below.

Meanwhile, the information insertion unit 120 may insert specific information into one uplink packet or a plurality of uplink packets among the uplink packets of the service flow. That is, the information insertion unit 120 may insert specific information into a number of uplink packets configured between the terminal apparatus 100 and the data transmission/reception apparatus 200 (UPF).

When the specific information is inserted into one uplink packet among the uplink packets of the service flow, the information insertion unit 120 may insert the specific information into a first uplink packet or a second uplink packet of the service flow. That is, the information insertion unit 120 may insert the specific information into an Nth uplink packet configured between the terminal apparatus 100 and the data transmission/reception apparatus 200 (UPF).

However, hereinafter, an embodiment in which the specific information is inserted into one first uplink packet of the service flow is described.

In this case, for the service flow according to the triggering condition satisfied this time, the information insertion unit 120 may insert specific information for defining the transmission path of the service flow into the first uplink packet among the uplink packets and may not insert the specific information into the second uplink packet or subsequent uplink packets.

Meanwhile, the information insertion unit 120 determines (selects) specific information for defining the transmission path of the service flow on the basis of a pre-occupied information table and policy information and inserts the specific information into an uplink packet.

Hereinafter, a process of selecting specific information is described in detail.

Specifically, the terminal apparatus 100 according to the present disclosure may have policy information for selecting specific information on the basis of the satisfied triggering condition in an information table including a plurality of pieces of specific information.

For example, the policy storage unit 140 may store/possess the information table including the plurality of pieces of specific information and policy information for selecting specific information on the basis of the triggering information.

The information table and the policy information stored/possessed in the policy storage unit 140 may be stored/possessed after being received from a core network, that is, 5G N/W (for example, AMF, 3rd-party MEC server, or Mgmt server) and may be updated to the latest version by being requested/received from 5G N/W at the time point at which the operation of the terminal apparatus 100 (specifically, ULCL agent) is initiated, at the time point at which the triggering condition is satisfied, periodically, or at the time point at which a predefined event is generated.

The information table including the plurality of pieces of specific information may be an information table including a plurality of pieces of specific information, that is, a plurality of service codes for defining at least one of a service type (for example, eMBB, mMTC, or URLLC) of the transmission path, address information of a device corresponding to a destination of the transmission path, service capacity information of the transmission path, and delay information.

The policy information is a policy defined to determine specific information (a service code) to be inserted among the plurality of pieces of specific information in the information table and a service flow into which the specific information is inserted in consideration of the triggering condition satisfied this time.

When the predefined triggering condition is satisfied, the information insertion unit 120 identifies a target service flow (for example, a service flow of the service type URLLC) to which the ULCL function of the terminal is applied among the service flows separated by the separation unit 110 on the basis of the triggering condition satisfied this time and the policy information and selects specific information (for example, a service code) to be inserted into the target service flow (for example, the service flow of the service type URLLC) in the information table.

After the time point at which the selection is performed, the information insertion unit 120 may insert specific information (service code) into a first uplink packet of the target service flow (for example, the service flow of the service type URLLC).

Accordingly, for service flows other than the target service flow (for example, the service flow of the service type URLLC) to which the ULCL function of the terminal is applied, among the service flows separated by the separation unit 110, the information insertion unit 120 neither selects nor inserts specific information.

A field of the uplink packet into which the specific information is inserted includes any field at a location configured between the terminal apparatus 100 and the data transmission/reception apparatus 200 (UPF).

For example, the specific information may be inserted into an option field of a packet header of the uplink packet, for example, an IP header, an option field of a TCP header, or a payload field.

At this time, the specific information may include a service code for defining at least one of a service type (slice ID) supported in the transmission path, address information (hereinafter, referred to as destination address information) of a device corresponding to a destination of the transmission path, service capacity information of the transmission path, and delay information.

That is, it is preferable that the specific information be information having a small size in units of bits.

According to a first embodiment, the specific information may be defined as one service code for defining a service type (slice ID), destination address information, service capacity information of the transmission path, and delay information.

Figure 5:
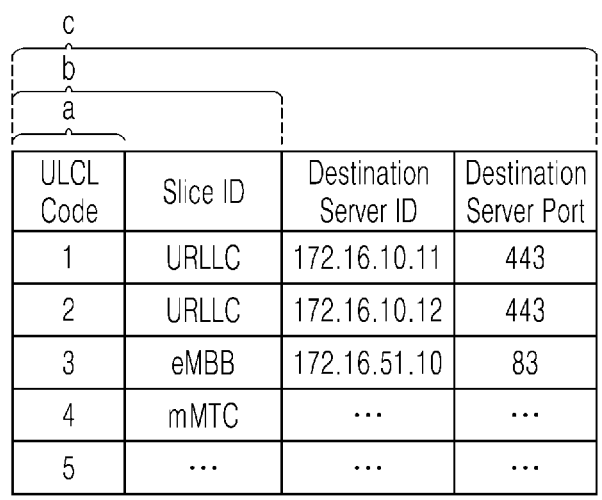
FIG. 5 illustrates the configuration of specific information inserted by a terminal according to an embodiment of the present disclosure.

In this case, referring to FIG. 5, specific information (a) inserted into the uplink packet may be one service code (ULCL code).

In this case, it is preferable that the data transmission/reception apparatus 200 (UPF) predefine a service type (for example, eMBB, mMTC, or URLLC) of the transmission path that should be generated according to the corresponding code for each single service code, destination address information (IP/port), service capacity information of the transmission path, and delay information (definition table described below).

According to a second embodiment, the specific information may be defined as a service code for defining a service type (slice ID), destination address information for each service type (slice ID), service capacity information of the transmission path, and delay information.

In this case, referring to FIG. 5, specific information (b) inserted into the uplink packet includes a slice ID and a ULCL code.

In this case, it is preferable that the data transmission/reception apparatus 200 (UPF) predefine destination address information (IP/port), service capacity information of the transmission path, and delay information for each combination of service type (slice ID) and service code (definition table described below).

That is, the second embodiment has an advantage in that the size of the definition table that the data transmission/reception apparatus 200 (UPF) should possess can be reduced compared to the first embodiment.

According to a third embodiment, the specific information may be defined as a service type (slice ID), service capacity information of the transmission path for each service type (slice ID), a service code for defining delay information, and destination address information (IP/port).

In this case, referring to FIG. 5, the specific information (c) inserted into the uplink packet includes a slice ID, a ULCL code, and destination address information (IP/port).

In this case, it is preferable that the data transmission/reception apparatus 200 (UPF) predefine service capacity information of the transmission path and delay information for each combination of service type (slice ID) and service code (definition table described below).

Further, the data transmission/reception apparatus 200 (UPF) may use the destination address information (IP/port) within the specific information for generating the transmission path.

That is, the third embodiment has an advantage in that the size of the definition table that the data transmission/reception apparatus 200 (UPF) should possess can be reduced compared to the first embodiment and the second embodiment.

The transmission unit 130 transmits the uplink packet to a data node, that is, the data transmission/reception apparatus 200 (UPF) of the terminal apparatus 100.

Then, when receiving the uplink packet from the terminal apparatus 100, the data transmission/reception apparatus 200 (UPF) may identify whether there is specific information (service code) for defining the transmission path in the uplink packet, generate a transmission path to the local network 10 (for example, the URLLC network) according to the corresponding service code when there is a service code, and configure the generated transmission path as a service flow path of this uplink packet.

Further, the information insertion unit 120 may insert request information that makes a request for deleting the transmission path into the last uplink packet of the transmitted service flow with at least one uplink packet (for example, a first uplink packet) into which specific information is inserted.

It is preferable that the request information be information in the form of a service code having a small size in units of bits, and that a field of the uplink packet into which the request information is inserted include any field at a location configured between the terminal apparatus 100 and the data transmission/reception unit 200 (UPF).

Then, if the uplink packet into which the service code that makes a request for deleting the transmission path is identified when the uplink packet is received from the terminal apparatus 100, the data transmission/reception apparatus 200 (UPF) may delete the transmission path to the local network 10 (for example, the URLLC network) configured as the service flow path of the corresponding uplink packet according to the corresponding service code.

Hereinafter, the configuration of a data transmission/reception apparatus according to a preferable embodiment of the present disclosure is described with reference to FIG. 4.

Figure 4:
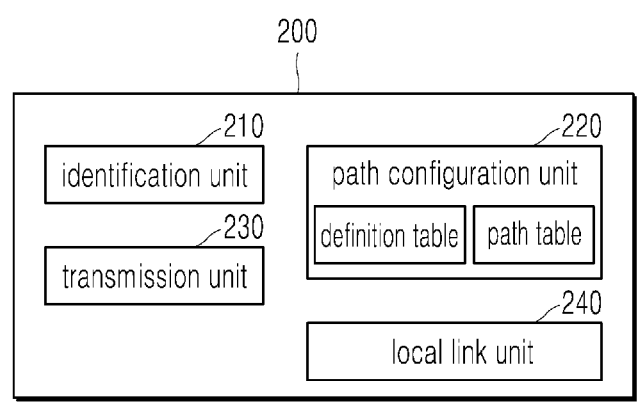
FIG. 4 is a block diagram illustrating the configuration of a data transmission/reception apparatus according to an embodiment of the present disclosure.

As illustrated in FIG. 4, the data transmission/reception apparatus 200, that is, the UPF 200 according to an embodiment of the present disclosure, includes an identification unit 210, a path configuration unit 220, and a transmission unit 230.

The UPF 200 according to the present disclosure may further include a local link unit 240.

Some or all of the identification unit 210, the path configuration unit 220, the transmission unit 230, and the local link unit 240 may be implemented as a ULCL server for performing ULCL of the terminal proposed by the present disclosure.

When an uplink is received, the identification unit 210 identifies whether there is specific information for defining a transmission path in the uplink.

Hereinafter, for convenience of description, the case in which the uplink packet is received from the terminal apparatus 100 is described.

The identification unit 210 may identify whether there is specific information (for example, a service code) for defining the transmission path in the uplink packet whenever the uplink packet is received from the terminal apparatus 100.

When the terminal apparatus 100 inserts specific information (for example, a service code) into a first uplink packet of a service flow to which ULCL of the terminal proposed by the present disclosure is applied and transmits the uplink packet, the identification unit 210 may identify, in the terminal apparatus 100, specific information (for example, a service code) in the uplink packet of the service flow to which the ULCL of the terminal is applied.

When the identification unit 210 identifies the existence of the specific information (for example, a service code), the path configuration unit 220 generates a transmission path according to the identified specific information (for example, a service code) and configures the transmission path as the service flow path of this uplink packet.

Specifically, the local link unit 240 is a functional unit for supporting the generation of at least one transmission path having a destination of a device within each local network by linking with at least one local network.

That is, in order to generate the transmission path according to the specific information (for example, a service code), the UPF 200 according to the present disclosure should have a physical connection relationship with the device within the local network, for example, the second DN 10 (for example, the URLLC network) and the third DN 20 (for example, the internal network_UPF), and the local link unit 240 provides the connection relationship.

At this time, the UPF 200 (particularly, the local link unit 240) may link to the second DN 10 (for example, the URLLC network) through an N6 I/F defined on the basis of a 5G service interface and link to the third DN 20 (for example, the internal network_UPF) through an N9 I/F defined on the basis of a 5G service interface.

The path configuration unit 220 may pre-possess/store a definition table for pre-defining a service type (for example, eMBB, mMTC, or URLLC) of the transmission path that should be generated according to corresponding specific information for each piece of the specific information, address information of a device corresponding to a destination of the transmission path, service capacity information of the transmission path, and delay information.

The definition table of the path configuration unit 220 may be stored/possessed after being provided from the core network, that is, 5G N/W (for example, AMF, 3rd-party MEC server, or Mgmt server) and equally updated at the time point at which the terminal apparatus 100 (specifically the ULCL agent) updates the information table and the policy information.

At this time, the form of the definition table may be divided according to the following embodiments.

According to the first embodiment, specific information may be defined as a single service code, and the definition table may be information for pre-defining a service type (for example, eMBB, mMTC, or URLLC) of the transmission path that should be generated according to the corresponding code for each service code, destination address information (IP/port), service capacity information of the transmission path, and delay information.

That is, the UPF 200 according to the present disclosure may have a definition table for pre-defining a service type (for example, eMBB, mMTC, or URLLC) of the transmission path that should be generated according to the corresponding code, destination address information (IP/port), service capacity information of the transmission path, and delay information for each service code (each ULCL code).

According to the second embodiment, the specific information may be defined as a service type (slice ID) and a service code, and the definition table may be information for pre-defining destination address information (IP/port), service capacity information of the transmission path, and delay information for each combination of a service type (slice ID) and a service code.

According to the third embodiment, specific information may be defined as a service type (slice ID), a service code, and destination address information (IP/port), and the definition table may be information for pre-defining service capacity information of the transmission path and delay information for each combination of a service type (slice ID) and a service code.

When the identification unit 210 identifies the existence of the specific information (for example, a service code) within this uplink packet, the path configuration unit 220 may identify information indicated by the identified specific information (for example, a service code), that is, a service type (for example, URLLC) of the transmission path, address information (for example, 172.16.XXX.YYY) corresponding to a destination device (for example, a local server for the URLLC service), service capacity information (for example, 1 Gb/s) of the transmission path, and delay information (for example, 0.1 ms) in the definition table.

When the transmission path according to the information identified in the definition table can be generated within the range supported by the local link unit 240, the path configuration information 220 may generate the transmission path to the local network 10 according to the specific information (for example, a service code) identified (recognized) this time.

The path configuration unit 220 may store mapping information for mapping service flow separation information (for example, 5-tuple) of this uplink pack and the transmission path generated this time in a path table and configure the transmission path generated according to the specific information (for example, a service code) identified this time as the service flow path of the uplink packet this time.

Meanwhile, when the transmission path according to the information identified in the definition table cannot be generated with the range supported by the local link unit 240, the path configuration unit 220 fails in generating the transmission path to the local network 10 according to the specific information (for example, a service code) identified this time.

The transmission unit 230 transmits the uplink packet separated by the service flow generating the transmission path among the received uplink packets along the corresponding transmission path.

That is, the transmission unit 230 may separate service flows on the basis of information included in a packet header, for example, 5-tuple (Source IP, Destination IP, Source Port, Destination Port, Protocol ID) in every received uplink packet.

The transmission unit 230 identifies whether there is service flow separation information (5-tuple) of the uplink packet in the path table in every uplink packet.

The case in which there is service flow separation information (5-tuple) of the uplink packet in the path table corresponds to the case in which the service flow path of the uplink packet this time is preconfigured as the transmission path to the local network 10 (for example, the URLLC network), in which case the uplink packet this time may or may not include specific information (for example, a service code).

The case in which there is no service flow separation information (5-tuple) of the uplink packet in the path table corresponds to the case in which generation of the transmission path fails or the uplink packet is not a target to which the ULCL of the terminal proposed by the present disclosure is applied.

The transmission unit 230 transmits the uplink packet for which the service flow separation information (5-tuple) exists in the path table among the received uplink packets through the transmission path to the local network 10 (for example, the URLLC network) mapped within the path table.

Meanwhile, the transmission unit 230 may transmit the uplink packet which has specific information (for example, a service code) but for which the path configuration unit 220 fails in generating the transmission path among the received uplink packets through the default data network, that is, the first DN (for example, the Internet).

Further, the transmission unit 230 may transmit the uplink packet for which no service flow separation information (5-tuple) exists in the path table among the received uplink packets through the default data network, that is, the first DN (for example, the Internet).

Of course, the data transmission/reception apparatus 200 (UPF) transmits traffic (uplink packets) to the local network 10 or 20 through the transmission path according to the service code and then may perform transmission to the terminal apparatus 100 on the basis of the service flow path (transmission path) when receiving response traffic (downlink packets) from the local network 10 or 20 on the basis of the operation of the ULCL server.

Further, when reception of the uplink packet into which request information that makes a request for deleting the transmission path is identified, the path configuration unit 220 may delete the transmission path configured as the service flow path of the corresponding uplink packet.

For example, when receiving the uplink packet, the identification unit 210 may identify not only specific information for defining the transmission path within the uplink packet but also the existence of request information that makes a request for deleting the transmission path in the form of a service code.

In the embodiment in which the terminal apparatus 100 inserts the service code that makes a request for deleting the transmission path into the last uplink of the service flow to which the ULCL of the terminal proposed by the present disclosure is applied and transmits the uplink packet, the identification unit 210 may identify the service code of the request for deleting the transmission path in the last uplink packet at which the service flow to which the ULCL of the terminal is applied by the terminal apparatus 100 ends.

When the identification unit 210 identifies the uplink packet (last uplink packet of the service flow) into which request information, that is, the service code that makes a request for deleting the transmission, is inserted, the path configuration unit 220 deletes the transmission path configured as the service flow path of the corresponding uplink packet.

Specifically, the path configuration unit 220 deletes the transmission path configured as the service flow path of the corresponding uplink packet and also deletes mapping information pre-stored in the path table.

Further, among the pre-generated transmission paths, the path configuration unit 220 may delete a transmission path through which packet transmission or reception is not generated for a preset path maintenance time from a configuration time or for a preset threshold time or a transmission path according to reception of a control event from the core network according to the predefined policy.

As described above, according to the ULCL function of the terminal proposed by the present disclosure, when the terminal apparatus 100 determines (selects) specific information (for example, a service code) for defining the transmission path, inserts the specific code into an uplink packet, and transmits the uplink packet on the basis of specific information (for example, a service code) configured between the terminal apparatus 100 and the transmission/reception device 200 (UPF), the data transmission/reception apparatus 200 (UPF) may generate the transmission path according to the specific information (for example, a service code) and steer traffic to the local network.

That is, according to the ULCL of the terminal proposed by the present disclosure, the terminal may independently steer the transmission path of its own traffic (uplink/downlink) on the basis of specific information (for example, a service code).

According to the ULCL of the terminal proposed by the present disclosure, the UPF does not depend on information (terminal identifier/destination IP address/prefix) provided from the SMF, so that problems with the conventional 5G ULCL function, such as overhead of the SMF generated by continuous management of a large amount of information, such as a terminal identifier/destination IP address/prefix to be transmitted to each UPF, a waiting time for which the UPF depends on the SMF and waits for required information (or commands), overhead of the UPF generated by continuous management of information of the received terminal identifier/destination IP address/prefix, and an increase in signaling between the SMF and the UPF may be effectively avoided.

Accordingly, the present disclosure derives an effect of resolving the problems of the conventional 5G ULCL function and efficiently supporting requirements/performance of the URLLC service supported by 5G as the terminal implements a new technology, that is, the ULCL of the terminal capable of controlling steering of the transmission path of its own traffic.

Hereinafter, an example of performing the ULCL function of the terminal proposed by the present disclosure is described with reference to FIG. 7.

Figure 7:
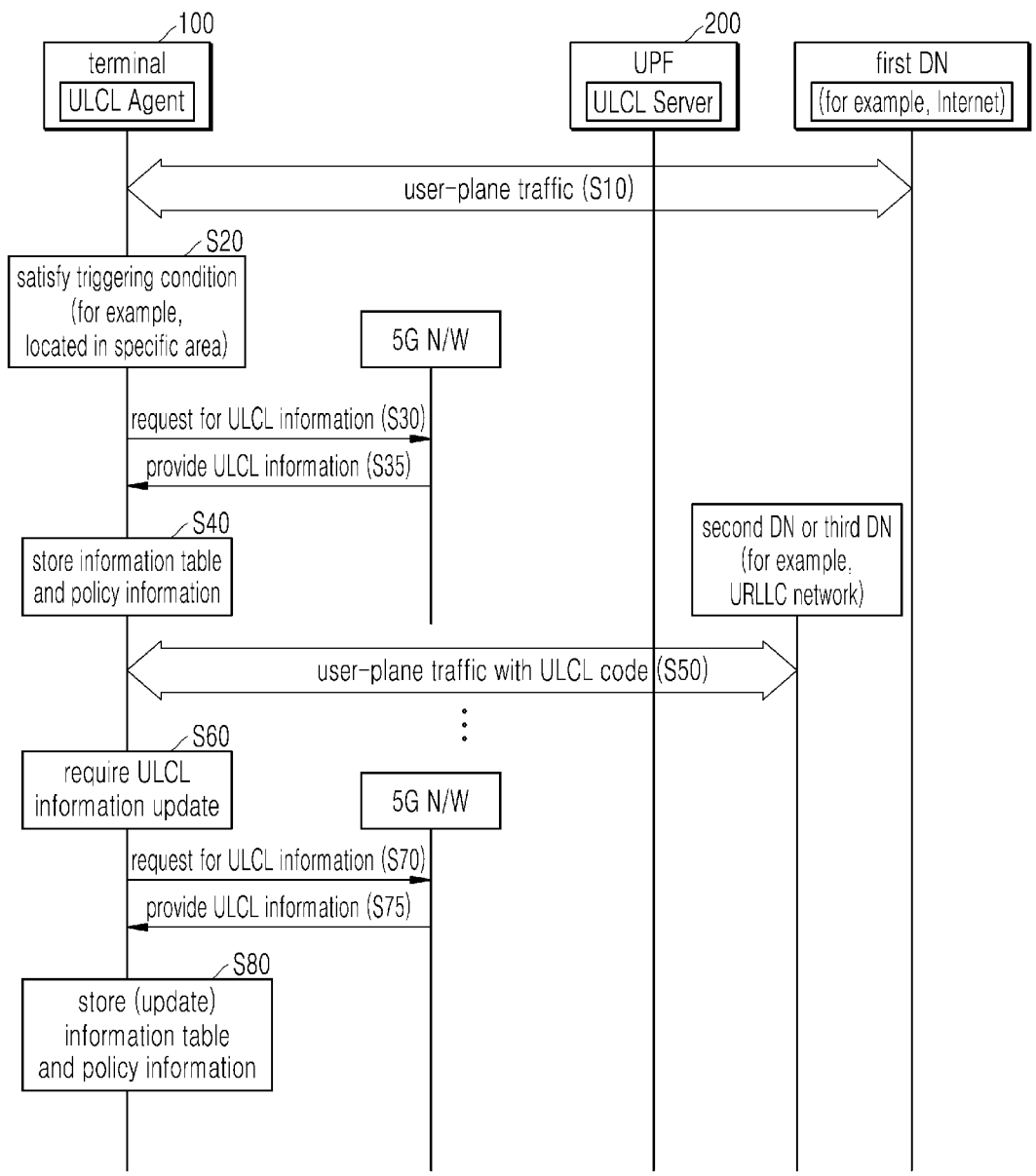
FIG. 7 illustrates an example in which a ULCL function of a terminal proposed by the present disclosure is performed.

As illustrated in FIG. 7, the terminal apparatus 100 may transmit and receive user-plane traffic to and from a default data network, that is, a first DN (for example, the Internet) through the UPF 200 in S10.

At this time, when a predefined triggering condition is satisfied in S20, the terminal apparatus 100 (ULCL agent) according to the present disclosure may make a request for and receive information (for example, an information table and policy information) for the ULCL function of the terminal from a core network, for example, a 5G N/W (for example, AMF, 3rd-party MEC server, or Mgmt server) in S30 and S35, and store the information table and the policy information in S40.

The terminal apparatus 100 (ULCL agent) according to the present disclosure may insert specific information (for example, a ULCL code) for defining a transmission path of a service flow into an uplink packet of the target service flow to which the ULCL function of the terminal is applied, transmit the uplink packet to the UPF 200, generates a transmission path to a local data network (a second DN or a third DN, for example, a URLLC network) according to the specific information (for example, the ULCL code) within the uplink packet, and steer user-plane traffic to the local network in S50.

When an uplink of information (for example, the information table and the policy information) for the ULCL function of the terminal is needed due to various changes in circumstance, such as assigning of a new ULCL code or assigning of a new slice ID in the core network in S60, the terminal apparatus 100 (ULCL agent) according to the present disclosure may update the information table and the policy information to the latest version in S80 by transmitting a request for and receiving information from the core network in S70 and S75.

Hereinafter, a method of operating a terminal apparatus according to an embodiment of the present disclosure is described with reference to FIG. 8. For convenience of description, reference numerals illustrated in FIG. 2 are used.

Figure 8:
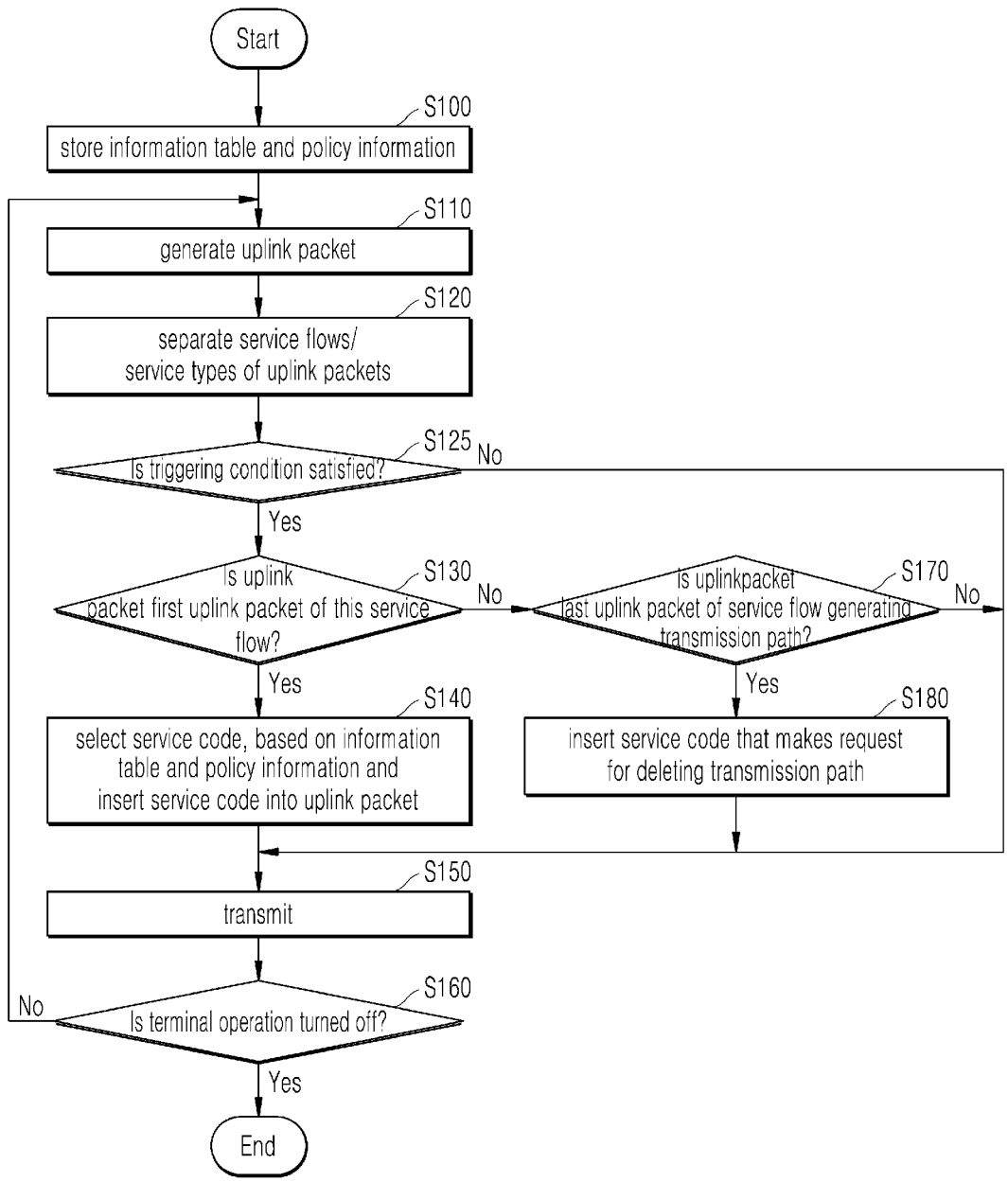
FIG. 8 is a flowchart illustrating a method of operating a terminal apparatus according to an embodiment of the present disclosure.

As illustrated in FIG. 8, it is preferable that the terminal apparatus 100 (ULCL agent) according to the present disclosure store an information table and policy information in S100.

The information table may be an information table including a plurality of pieces of specific information, that is, a plurality of service codes for defining at least one of a service type (for example, eMBB, mMTC, or URLLC) of the transmission path, address information of a device corresponding to the destination of the transmission path, service capacity information of the transmission path, and delay information.

The policy information is a policy defined to determine specific information (service code) to be inserted among the plurality of pieces of specific information in the information table and a service flow into which the specific information is inserted in consideration of the satisfied triggering condition.

When an uplink packet to be transmitted is generated in S110, the terminal apparatus 100 (ULCL agent) may separate service flows on the basis of information included in a packet header, for example, 5-tuple (Source IP, Destination IP, Source Port, Destination Port, Protocol ID) in every uplink packet in S120.

At this time, the terminal apparatus 100 (ULCL agent) according to the present disclosure may also separate service types (for example, eMBB, mMTC, and URLLC) for the service flow of the uplink packets in S120.

Meanwhile, the terminal apparatus 100 (ULCL agent) according to the present disclosure continuously determines whether the predefined triggering condition is satisfied in S125. Although FIG. 8 illustrates step S125 after step S120 for convenience of description, the terminal apparatus 100 (ULCL agent) according to the present disclosure may continuously determine whether the triggering condition is satisfied by constantly performing step S125.

The triggering condition may be defined to be satisfied when a specific service flow that requires configuration of a transmission path on the basis of specific information is generated, when a slice ID of a specific service type that requires configuration of a transmission path on the basis of specific information is used, when the quality of a radio signal becomes equal to or smaller than a specific value that requires configuration of a transmission path on the basis of specific information, when the terminal apparatus is located in a specific area that requires configuration of a transmission path on the basis of specific information, when an amount of used traffic is larger than a specific value that requires configuration of a transmission path, or when a control event is received from a core network.

When the triggering condition is satisfied (Yes in S125), the terminal apparatus 100 (ULCL agent) according to the present disclosure may identify a target service flow (for example, a service flow of the service type URLLC) to which the ULCL function of the terminal is applied on the basis of the triggering condition satisfied this time and policy information, select specific information (for example, a service code) to be inserted into the target service flow (for example, the service flow of the service type URLLC) in the information table, insert the specific information (for example, a service code) into the uplink packet, and transmit the uplink packet.

Hereinafter, an embodiment in which the specific information is inserted into one first uplink packet of the target service flow is described.

When the triggering condition is satisfied (Yes in S125), the terminal apparatus 100 (ULCL agent) according to the present disclosure activates the ULCL function of the terminal, identifies a target service flow (for example, the service flow of the service type URLLC) to which the ULCL function of the terminal is applied on the basis of the triggering condition satisfied this time and policy information, and identifies whether the uplink packet is a first uplink packet of the target service flow (for example, the service flow of the service type URLLC) after the time point at which the ULCL function of the terminal is activated in S130.

When the uplink packet is the first uplink packet of the target service flow (for example, the service flow of the service type URLLC) (Yes in S130), the terminal apparatus 100 (ULCL agent) according to the present disclosure selects specific information (for example, a service code) to be inserted into the target service flow (for example, the service flow of the service type URLLC) on the basis of policy information in the information table and then inserts the specific information into the uplink packet in S140.

Meanwhile, when the uplink this time is not the first uplink packet of the target service flow after the time point at which the ULCL function of the terminal is activated (No in S130), the terminal apparatus 100 (ULCL agent) according to the present disclosure identifies that the uplink packet is the last uplink packet of the service flow generating the transmission path in S170.

When the uplink packet is the last uplink packet of the service flow generating the transmission path (Yes in S170), the terminal apparatus 100 (ULCL agent) according to the present disclosure may insert request information, that is, a service code that makes a request for deleting the transmission path in S180.

The terminal apparatus 100 (ULCL agent) according to the present disclosure transmits the uplink packet to a data node, that is, the data transmission/reception apparatus 200 (UPF) of the terminal apparatus 100, in S150.

Unless the operation is turned off (No in S160), the terminal apparatus 100 (ULCL agent) according to the present disclosure continues to perform the operation of selecting specific information whenever the uplink packet to be transmitted is generated, determining whether to insert the specific information, and inserting the specific information by repeating step S110 and subsequent steps.

Hereinafter, a method of operating a data transmission/reception apparatus (UPF) according to an embodiment of the present disclosure is described with reference to FIG. 9.

When an uplink packet is received in S200, the UPF 200 (ULCL server) according to the present disclosure identifies whether there is a service code (ULCL code) within the uplink packet in S210.

When a service code exists (Yes in S210), if the corresponding service code is a service code for defining a transmission path within the uplink packet (Yes in S215), the UPF 200 (ULCL server) according to the present disclosure may identify information indicated by the service code, that is, a service type (for example, URLLC) of the transmission path, address information (for example, 172.16.XXX.YYY) corresponding to a destination device (for example, a local server for the URLLC service), service capacity information (for example, 1 Gb/s) of the transmission path, and delay information (for example, 0.1 ms) in the definition table, and determines whether the transmission path according to the identified information can be generated within a range supported by the local link unit 240 in S220.

When the transmission path can be generated within a range supported by the local link unit 240 (Yes in S220), the UPF 200 (ULCL server) according to the present disclosure may generate a transmission path to the local network 10 (for example, the URLLC network) according to the service code identified this time and transmit thus uplink packet this time through the corresponding transmission path in S230.

The UPF 200 (ULCL server) according to the present disclosure may store mapping information for mapping service flow separation information (for example, 5-tuple) of the uplink pack this time and the transmission path generated this time in a path table and configure the transmission path generated according to the service code identified this time as the service flow path of the uplink packet this time in S240.

When the transmission path cannot be generated within a range supported by the local link unit 240 and thus generation of the transmission path according to the service code fails (No in S220), the UPF 200 (ULCL server) according to the present disclosure may transmit the uplink packet to a default data network (for example, the Internet) in S280.

Meanwhile, when there is no service code in the received uplink packet (No in S210), the UPF 200 (ULCL server) according to the present disclosure identifies whether there is service flow separation information (5-tuple) of the uplink packet in the path table in S260.

When there is service flow separation information (5-tuple) in the path table (Yes in S260), the UPF 200 (ULCL server) according to the present disclosure may transmit the uplink packet through the transmission path to the local network 10 (for example, the URLLC network) mapped within the path table in S270.

Meanwhile, when there is no service flow separation information (5-tuple) of the uplink packet in the path table (No in S260), the UPF 200 (ULCL server) according to the present disclosure may transmit the uplink packet to the default data network (for example, the Internet) in S280.

Meanwhile, when the service code exists (Yes in S210), if the corresponding service code is a service code that makes a request for deleting the transmission path (No in S215), the UPF 200 (ULCL server) according to the present disclosure may delete the transmission path configured as the service flow path of the corresponding uplink packet according to the service code that makes a request for deleting the transmission path, and may also delete the mapping information pre-stored in the path table in S290.

Further, among the pre-generated transmission paths, the UPF 200 (ULCL server) according to the present disclosure may delete a transmission path through which packet transmission or reception is not generated for a preset path maintenance time from a configuration time or for a preset threshold time according to a predefined policy.

Unless operation is turned off (No in S250), the UPF 200 (ULCL server) according to the present disclosure may continue to perform the operation of identifying specific information whenever the uplink packet is received, generating a transmission path, and transmitting the uplink packet by repeating step S200 and subsequent steps.

Accordingly, the present disclosure conveys an effect of resolving the problems with the conventional 5G ULCL function and efficiently supporting requirements/performance of the URLLC service supported by 5G as the terminal implements a new technology, that is, ULCL of the terminal capable of controlling steering of the transmission path of its own traffic.

As described above, the method of operating the terminal apparatus and the method of operating the data transmission/reception apparatus according to an embodiment of the present disclosure may be implemented in the form of program instructions that can be executed through various computer means and recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. A system comprising:
   a terminal comprising a non-transitory computer-readable medium to store at least one first instruction that, when executed by the terminal, causes the terminal to:
   separate uplink packets to be transmitted into a plurality of service flows;
   determine that a predefined triggering condition is satisfied;
   when the triggering condition is satisfied, insert specific information for defining the transmission path of the service flow into an uplink packet, of the uplink packets, included in the service flow, according to the satisfied triggering condition; and
   transmit the uplink packet having the inserted specific information to a data node,
   wherein one or more additional packets in the service flow are exchanged between the terminal and data node via the transmission path that is defined based on the specific information inserted into the uplink packet.

2. The system of claim 1, wherein the at least one first instruction, when executed by the terminal, further causes the terminal to insert the specific information into a first uplink packet of the service flow.

3. The system of claim 1, wherein the at least one first instruction, when executed by the terminal, further causes the terminal to:
 pre-store policy information for selecting specific information based on the triggering conditioning an information table, and
 select and insert the specific information based on the information table and the policy information.

4. The system of claim 1, wherein the specific information comprises a service code for defining at least one of:
 a service type supported by the transmission path,
 address information of a device corresponding to a destination of the transmission path,
 service capacity information of the transmission path, or delay information.

5. The system of claim 1, wherein the at least one first instruction, when executed by the terminal, further causes the terminal to insert request information for requesting deletion of the transmission path into a last uplink packet of the service flow associated with the uplink packet into which the specific information is inserted.

6. The system of claim 1, wherein the triggering condition is satisfied based on an occurrence of at least one of:
 when a service flow, of the plurality of services flows, requires configuration of a corresponding transmission path,
 when a slice identifier (ID) of a specific service type that requires configuration of the transmission path is used,
 when a quality of a radio signal becomes equal to or less than a specific value that requires configuration of the transmission path based,
 when the terminal is located in a specific area that requires configuration of the transmission path,
 when an amount of used traffic is larger than a specific value that requires configuration of the transmission path, or
 when a control event is received from a core network.

7. A method comprising:
 separating, by a terminal, uplink packets to be transmitted into a plurality of service flows;
 determining, by the terminal, that a predefined triggering condition is satisfied;
 inserting, by the terminal and when the triggering condition is satisfied, specific information for defining the transmission path of the service flow, of the plurality of service flows, into an uplink packet, of ones of the plurality of uplink packets that are separated into the service flow, according to the satisfied triggering condition; and
 transmitting, by the terminal, the uplink packet to a data node,
 wherein the transmission path for carrying other packets in the service flow is defined between the terminal and the data node based on the specific information inserted into the uplink packet.

8. The method of claim 7, further comprising:
 identifying, by a data transmission/reception apparatus, whether the specific information for defining the transmission path is included within a received uplink packet;
 generating, by the data transmission/reception apparatus, the transmission path according to the specific information when the specific information is included in the received uplink packet, and configuring the generated transmission path for a particular service flow of the received uplink packet; and
 transmitting, by the data transmission/reception apparatus, another received uplink packet corresponding to the particular service flow through the transmission path.

9. The method of claim 8, wherein the generating of the transmission path comprises:
 storing mapping information for mapping service flow separation information of the received uplink packet and the generated transmission path in a path table and configuring the generated transmission path according to the specific information as a service flow path of the received uplink packet.

10. The method of claim 9, wherein the transmitting of the other received uplink packet corresponding to the particular service flow comprises:
 transmitting the other received uplink packet to a default data network when generation of the transmission path according to specific information included in the received uplink packet fails or service flow separation information is not included in the path table.

11. The method of claim 7, wherein inserting the information comprises inserting the specific information into a first uplink packet of the service flow.

12. The method of claim 7, further comprising:
 pre-storing policy information for selecting the specific information based on the triggering condition in an information table, wherein inserting the information comprises selecting and inserting the specific information based on the information table and the policy information.

13. The method of claim 7, wherein the specific information comprises a service code for defining at least one of
 a service type supported by the transmission path,
 address information of a device corresponding to a destination of the transmission path,
 service capacity information of the transmission path, or delay information.

14. A non-transitory storage medium to store at least one instruction that, when executed by a device, causes the device to perform steps of:
 separating uplink packets to be transmitted into a plurality of service flows;
 determining that a predefined triggering condition is satisfied;
 inserting, when the triggering condition is satisfied, specific information for defining the transmission path of the service flow, of the plurality of service flows, into an uplink packet, of ones of the plurality of uplink packets that are separated into the service flow, according to the satisfied triggering condition;
 transmitting the uplink packet; and
 transmitting or receiving another packet in the service flow via the transmission path defined based on the specific information inserted into the uplink packet.

* * * * *